United States Patent [19]

Tschudi et al.

[11] Patent Number: 4,797,587

[45] Date of Patent: Jan. 10, 1989

[54] TRIGGERING METHOD FOR A THYRISTOR SWITCH

[75] Inventors: Christoph Tschudi; Fritz Wittwer, both of Untersiggenthal, Switzerland

[73] Assignee: BBC Brown, Boveri & Company Limited, Baden, Switzerland

[21] Appl. No.: 31,862

[22] Filed: Mar. 30, 1987

[30] Foreign Application Priority Data

Apr. 14, 1986 [CH] Switzerland .................. 1479/86

[51] Int. Cl.$^4$ .............................................. H03K 17/72
[52] U.S. Cl. .................................. 307/646; 307/311; 363/54; 363/57; 323/210
[58] Field of Search ................ 307/311, 645, 646; 363/54, 57, 58; 323/210, 211

[56] References Cited

U.S. PATENT DOCUMENTS

| | | | |
|---|---|---|---|
| 3,938,032 | 2/1976 | Demarest | 307/646 |
| 4,162,442 | 7/1979 | Frank | 323/210 |
| 4,540,895 | 9/1985 | Takeda | 363/57 |
| 4,571,535 | 2/1986 | Gyugyi | 363/54 |

FOREIGN PATENT DOCUMENTS

| | | |
|---|---|---|
| 0066802 | 12/1982 | European Pat. Off. . |
| 3035716 | 4/1982 | Fed. Rep. of Germany . |
| 1549405 | 8/1979 | United Kingdom . |

OTHER PUBLICATIONS

Fuji Denki Seizo K.K. "Gate Controlling System of Thyristor Switch for Opening and Closing Capacitor'-'-Nov. 10, 1984-(Patents Abstracts of Japan).

Thyristor Switched Capacitors, TSC-Engberg, H. Frank, B. Klerfors-Sweden-.

*Primary Examiner*—John Zazworsky
*Attorney, Agent, or Firm*—Werner W. Kleeman

[57] ABSTRACT

A triggering method for a thyristor switch which has at least two thyristors wired in series and a thyristor wired in antiparallel to each of these thyristors. The thyristor switch is triggered or cut off as a function of a specifiable on-off signal. At least a single triggering of a thyristor to be switched-on takes place at the earliest if a positive anode-cathode voltage is applied to it which exceeds a specifiable switch-on voltage limiting value. The method comprises generating a trigger standby signal if the on-off signal is in the switch-on condition and, with a specifiable minimum number of thyristors to be triggered wired in series, their anode-cathode voltage is greater than the specifiable switch-on voltage limiting value. At least a single triggering of each thyristor to be switched on takes place by means of a short-duration trigger pulse only during the duration of the trigger standby signal.

27 Claims, 5 Drawing Sheets

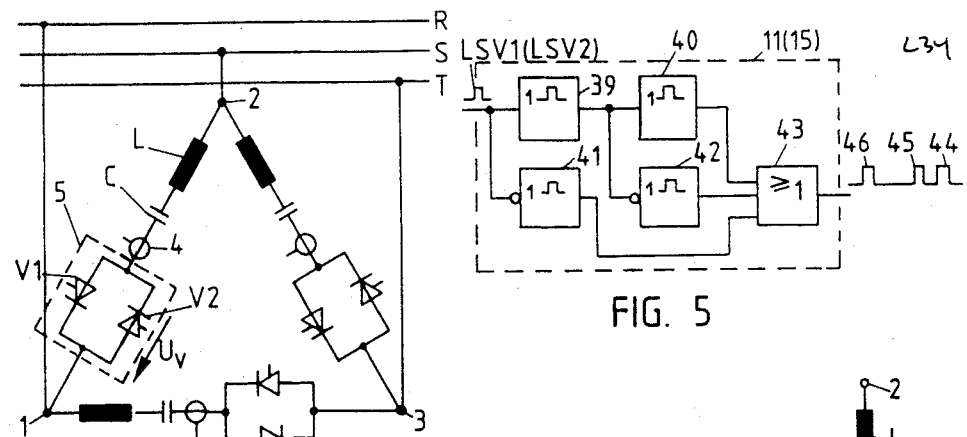
FIG. 1
FIG. 5
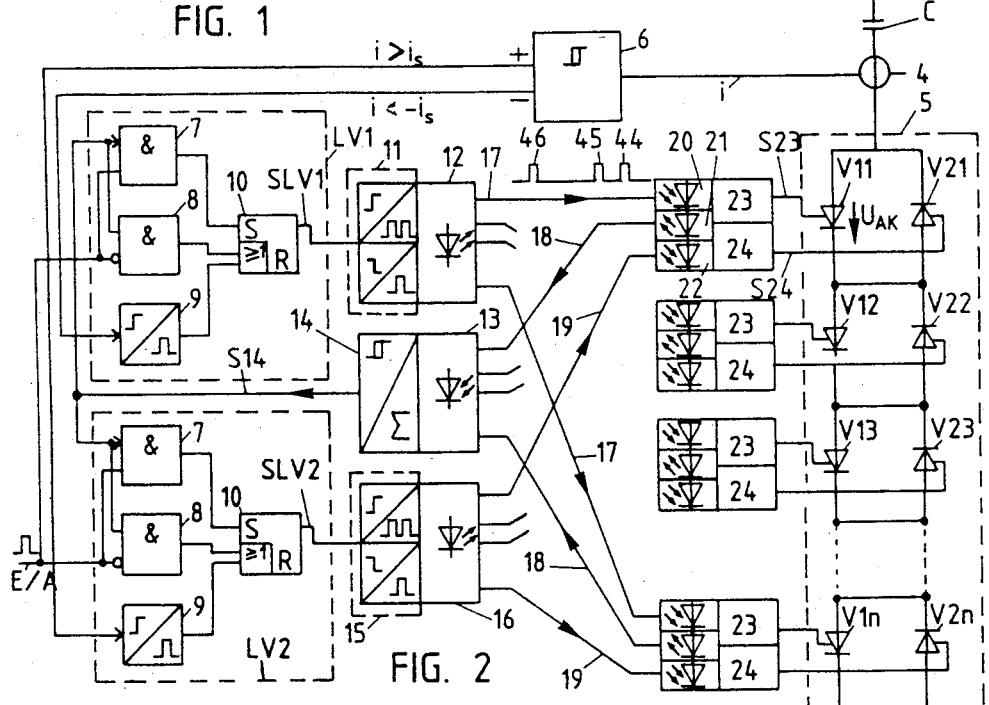
FIG. 2
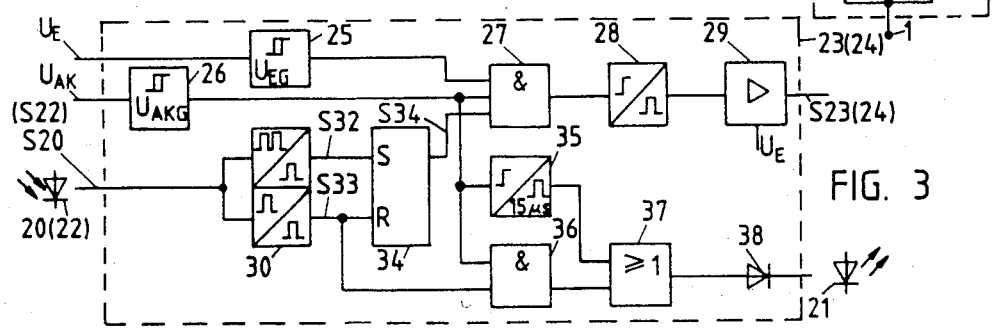
FIG. 3

TRIGGERING METHOD FOR A THYRISTOR SWITCH

BACKGROUND OF THE INVENTION

The invention is based on a triggering method for a thyristor switch.

In its more particular aspects the present invention specifically relates to a new and improved triggering method for a thyristor switch containing a multiple number of thyristors encompassing a predetermined number of series-connected thyristors and a predetermined number of thyristors connected antiparallel with respect to the aforementioned series connected thyristors. Such thyristor switch is either triggered or cut-off by means of a predetermined on-off signal for switching-on or switching-off the thyristor switch. Each one of the aforementioned thyristors are triggered or switched-on at least once and when the anode-cathode voltage if such thyristor exceeds a predetermined threshold value.

A triggering method for a thyristor switch is known for example through K. Engberg, H. Frank and B. Klerfors in "Thyristor switched capacitors, TSC, in theory and practise", IEEE Symposium, September 1985, London, pages 183–188. An AC switch employing antiparallel thyristors is described therein which is used for connecting a reactive current compensator capacitor in series with a choke coil to alternating-current conductors. The thyristor which is also designated as a "valve" in such circuits, should expediently switch on if thyristor or valve voltage passes through zero, or, if the thyristor or valve voltage has no passage through zero, at minimum thyristor or valve voltage. In practical operation, the thyristor or valve voltage may have several passages through zero during one half cycle of the alternating current as a result of disturbances such as, for example, those due to current harmonics. In order to ensure even in such cases that the alternating-current switch remains switched on after a switch-on instruction, the thyristors have to be triggered by repeated short-duration trigger pulses or by a long-duration trigger pulse of adequate energy. In the case of reactive power compensation in high-voltage conductors, several thyristors are connected in series, the information for generating the trigger pulses being transmitted from ground potential optionally via glass fibers to the high-voltage potential of the thyristors. The thyristors can then be triggered electrically or directly by optical means. Triggering with repeated short-duration trigger pulses only takes place if the anode-cathode voltage of the thyristor reaches a certain positive value. With thyristors wired in series, said minimum anode-cathode voltage may be reached at different times so that the start of the trigger pulses may vary correspondingly for the individual thyristors. This variation is due to the different capacitance of the individual thyristors (range of variation about ±5%).

SUMMARY OF THE INVENTION

Therefore, with the foregoing in mind it is a primary object of the present invention to provide a new and improved triggering method for a thyristor switch and which method is not afflicted with the drawbacks and limitation of the prior art methods.

Another and particularly significant object of the present invention is directed to a new and improved triggering method for a thyristor switch and which method ensures improved indirect optical triggering of the series-connection of thyristors in such thyristor switch.

Now in order to implement these and still further objects of the invention, which will become more readily apparent as the description proceeds, the triggering method of the present development is manifested by the features that, a trigger standby signal is generated if the on-off signal is in the switch-on condition and a predetermined minimum number of thyristors in the series-connection of thyristors of the thyristor switch have an anode-cathode voltage which is greater than a predetermined threshold value of such anode-cathode voltage. A short-duration trigger pulse is generated during the duration of the trigger standby signal, for at least once triggering each one of the thyristors in the series-connection of thryistors of the thyristor switch.

An advantage of the invention is that greater reliability is achieved in switching on the thyristor switch without the duration of the trigger pulses having to be increased. Via a check-back signal the triggering standby condition of all the thyristors to be triggered is evaluated and a trigger enable is only supplied if a specifiable number of thyristors are ready for triggering. As a result of this an almost simultaneous triggering is achieved of all the thyristors which are wired in series and have to be triggered. Simultaneously the risk to the thyristors due to their being undesirably switched off during multiple passages of the current through zero as a result of harmonic oscillations is eliminated.

According to an advantageous embodiment of the invention, this triggering instance is chosen so that, after the thyristors to be triggered have been triggered, the anode-cathode voltage on the remaining thyristors rise very rapidly so that triggering standby also occurs for the latter for a short time and reliable switching-on of the thyristor switch is ensured.

In regard to the relevant prior art, reference is additionally made to EP-A2-0,066,802 from which it is known that the triggering energy for a thyristor can be obtained from its main current path.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1 shows a basic circuit diagram of an absorption circuit or a static reactive power compensator which is connected to a three-phase network and contains thyristor switches and in which the inventive triggering method is carried out, FIG. 2 shows a first triggering circuit for a thyristor switch according to FIG. 1 having two logic circuits, two pulse generators and one trigger signal generator each for each thyristor of the thyristor switch, for carrying out a first exemplary embodiment of the inventive method, FIG. 3 shows a basic circuit diagram of a trigger signal generator according to FIG. 2 containing a pulse transformer, FIG. 5 shows a basic circuit diagram of a pulse generator according to FIG. 2.

DETAILED DESCRIPTION OF THE PREFERRED EMBODIMENTS

Figure 10:
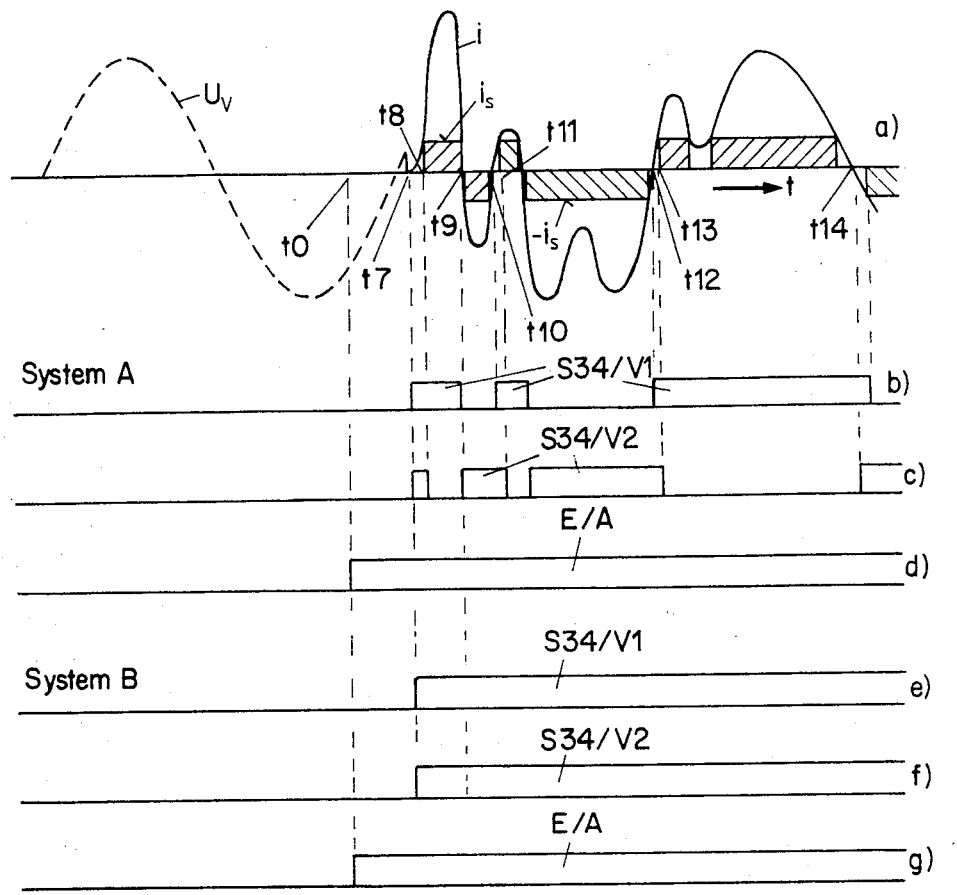
FIG. 10 shows a signal diagram for the switch-on behavior of a thyristor switch using the triggering circuits according to FIGS. 2 and 6.

Describing now the drawings, it is to be understood that only enough of the construction of a thyristor switch has been shown as needed for those skilled in the art to readily understand the underlying principles and concepts of the present development, while simplifying the showing of the drawings. Turning attention now specifically of FIG. 1 of the drawings, there has been shown a circuit connection of three absorption circuits of identical construction each consisting of a series circuit of a choke L, a capacitor C, a current transformer 4 and a thyristor switch or thyristor control 5 are delta-connected via absorption-circuit connection points 1, 2 and 3 between phase conductors R, S, T of a three-phase network carrying a voltage of 16 kV. The absorption circuits are tuned to the fifth harmonic of the three-phase network and damp the fifth harmonic. Delta circuits of identical construction are provided for the seventh and higher harmonics (not shown).

The same circuit can be used for reactive power compensation in a three-phase network, C denoting a reactive current compensation capacitor or a bank of capacitors and L denoting a choke coil for limiting the current rise on switch-on.

The thyristor switch 5, designed for a rated current of 2.5 KA, comprises antiparallel thyristors V1 and V2 at which a valve voltage $U_V$ appears in the switched-off condition. Each of these thyristors V1 or V2 is representative of a series circuit consisting of n=34 thyristors V11, V12, V13 ... V1n or V21, V22, V23 ... V2n (cf. FIG. 2), another thyristor being wired antiparallel to each thyristor. In principle, n is any integer $\geq 2$.

A first triggering circuit for performing a first exemplary embodiment of the inventive triggering method or triggering system A is shown in FIG. 2. In this connection, the same reference symbols have the same meaning in all the figures.

Each thyristor V11–V1n receives at its control electrode a trigger pulse S23 from an individual trigger pulse generator 23 and each thyristor V21–V2n antiparallel thereto receives a trigger pulse S24 from an individual trigger pulse generator 24. The voltage drop between anode and cathode of each thyristor is denoted by $U_{AK}$.

Each of the trigger pulse generators 23 shown in more detail in FIG. 3 is triggered by an individual light signal receiver 20 and each trigger pulse generator 24 by an individual light signal receiver 22.

Each of two paired trigger pulse generators 23 and 24 indicate the existence of an anode-cathode voltage $U_{AK}$, sufficient for triggering, by means of a common light signal transmitter 21. The signal outputs of the light signal transmitters 21 of all the trigger pulse generators 23, 24 are connected via light guide 18 to signal inputs of a light signal receiver 13 which is connected on the output side with a sum threshold value element 14. If at least 30%, preferably 80%, of the thyristors to be triggered have an anode-cathode voltage $U_{AK}$ which is larger than a specifiable switch-on voltage limiting or threshold value $U_{AKG}$ of $\geq 30$ V, in particular in the range from 40 V to 60 V, preferably of 50 V, the output signal S14 of the sum threshold value element 14 has the value logic "1", but otherwise logic "0". Said output signal S14 is fed on the input side through AND elements 7 and 8 of a first logic circuit LV1 for the trigger pulse generation of the thyristors V11 ... V1n having a first current conduction direction and simultaneously to AND elements 7 and 8 of a second logic circuit LV2 for the trigger pulse generation of the thyristors V21 ... V2n having a second current conduction direction opposite to the first current conduction direction. The logic circuits LV1 and LV2 are of identical construction. Furthermore, an on/off signal E/A is fed to the other inputs of the two AND elements 7 and also to the inverted inputs of the two AND elements 8. E/A="1" corresponds to a switch-on instruction for the thyristor switch 5 and E/A="0" to a switch-off instruction. The on/off signal E/A may be controlled, for example, as a function of the reaction power requirement of the three-phase network R, S, T. The output of the AND element 7 of each logic circuit LV1, LV2 is fed to the set input S of a RS flip-flop 10. The output of the AND element 8 of each logic circuit LV1, LV2 is fed to the reset input R of the RS flip-flop 10, which reset input can be triggered via an OR gate. The reset input R of the RS flip-flop 10 of the logic circuit LV1 is furthermore connected to a monostable multivibrator 9, which can be post-triggered during the pulse output, to a "−" output of a current threshold value detector 6 which is connected on the input side to the current transformer 4. The output signal of said "−" output assumes the value logic "1" for $i < -i_s$, but otherwise the value logic "0". Here i denotes the valve current or an actual current signal detected by means of the current transformer 4 and $i_s$ denotes a specifiable current threshold value corresponding to 5% –30% of the rated current preferably corresponding to 10% of the rated current.

A "+" output of the current threshold value detector 6 is connected via a monostable multivibrator 9, which can be post-triggered during the pulse output, and via an OR gate of the reset input R of the RS flip-flop or multivibrator 10 of the logic circuit LV2. The output signal of this "+" output assumes the value logic "1" for $i > i_s$, but otherwise the value logic "0".

A trigger window or signal SLV1 at the output of the first logic circuit LV1 or at the output of the RS flip-flop or multivibrator 10 of such first logical circuit LV1 is therefore set to "1" if simultaneously E/A="1" and S14="1". SLV1 is set to "0" if either S14="1" and E/A="0" simultaneously or if $i < -i_s$. At the output of the second logic circuit LV2 or at the output of the RS flip-flop or multivibrator 10 of such second logic circuit LV2 a trigger window signal SLV2 is set to "1" if E/A="1" and S14="1" simultaneously. SLV2 is set to "0" if either S14="1" and E/A="0" simultaneously or if i>$i_s$.

The output of LV1 is connected via a pulse generator 11 shown in more detail in FIG. 5 to a light signal transmitter 12. As a function of a "0"-to-"1" transition of the trigger window signal SLV1, the pulse generator 11 generates a double pulse 44, 45, and as a function of a "1"-to-"0" transition of SLV1 it generates a single pulse 46. These electrical pulses so generated are converted into optical signals in the light signal transmitter 12 by means of an infrared luminescence diode and transmitted via light guide 17 to the n light signal receivers 20, where they are converted by means of photo diodes into electrical signals and are fed in each case to an associated trigger pulse generator 23. In the same manner the trigger window signals SLV2 are transmitted via a light pulse generator 15, a light signal transmitter 16 and a light guide 19 to n light signal receivers 24, where they are fed in each case to an associated trigger signal generator 24. The pulse generator 15 is of the same construction as the pulse generator 11, the light signal transmitter 16 of the same constructions as the light signal transmitter 12 and the light signal receiver 22 of the same construction as the light signal receiver 20.

The FIG. 3 specifies a circuit for the identically constructed trigger pulse generators 23 and 24. The explanatory notes below relate to the trigger pulse generator 23. On the input side this receives from the light signal receiver 20 an electrical signal S20, assigned to the trigger window signal SLV1, which is fed to a pulse transformer 30. The pulse transformer 30 converts the double pulse 44, 45 generated in the pulse generator 11 and transmitted optically into a set pulse S32 which is fed on the output side to the set input S of a RS flip-flop 34. As a function of the single pulse 46 generated in the pulse generator 11 as a function of the falling edge of the trigger window signal SLV1 therein, the pulse transformer 30 furthermore generates a reset pulse S33 which is conveyed further to the reset input R of a RS flip-flop 34 and to a first input of an AND element 36. The AND element 36 is connected on the output side via an OR element 37 to a diode 38 which delivers on the cathode side an electrical signal to the light signal transmitter 21 (infrared luminescence diode).

There is a trigger standby signal S34="1" on the output of the RS flip-flop 34 after SLV1 changes from "0" to "1" and remains "1"; otherwise the trigger standby signal S34 has the logical value "0". The trigger standby signal S34 is fed to the first input of an AND element 27 whose output is connected via a monostable multivibrator 28, which can be post-triggered during the pulse output, to an amplifier 29 which is supplied from an auxiliary power source having a voltage $U_E$ (not shown) and at the output of which the trigger signal S23 can be tapped off. A second input of the AND element 27 is connected to the output of a threshold value detector 26 to the input of which the anode-cathode voltage $U_{AK}$ of the thyristor to be triggered, e.g. V11, is applied. If the anode-cathode voltage $U_{AK}$ exceeds the specifiable switch-on voltage limiting or threshold value $U_{AKG}$ of preferably 50 V, the output signal is 26="1", but otherwise= "0". A third input of the AND element 27 is connected to the output of a threshold value detector 25 to the input of which the voltage $U_E$ of the auxiliary power source is applied. If $U_E$ is greater than a specifiable limiting or threshold value $U_{EG}$ of preferably 25 V, at which the auxiliary power is sufficient to generate a sufficiently strong trigger pulse S23, the output signal is 25="1", but otherwise="0".

The second input of the AND element 27 is furthermore connected through the input of a monostable multivibrator 35, which can be post-triggered during the pulse output and delivers an output pulse of adjustable duration of preferably 15 μs, and to a second input of the AND element 36.

A trigger pulse S23 at the output of the amplifier 29 is therefore delivered to the control electrode of the associated thyristor, e.g. V11, only if $U_E$>$U_{EG}$, $U_{AK}$>$U_{AKG}$ and S34="1" simultaneously. If $U_{AK}$ becomes >$U_{AKG}$, a pulse is delivered via the threshold value detector 26, the multivibrator 35, the OR element 37, the diode 38, the light signal transmitter 21, the light guide 18 and the light signal receiver 13 to the sum threshold value element 14 and analogue-summed there.

Figure 4:
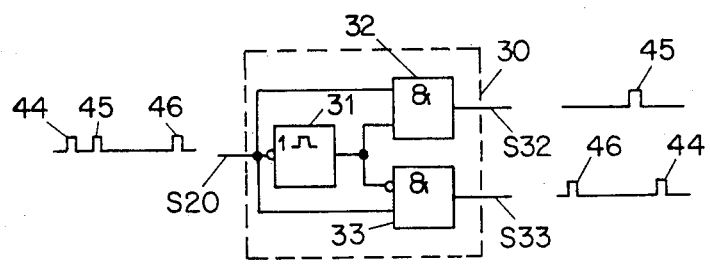
FIG. 4 shows a basic circuit diagram of a pulse transformer according to FIG. 3.

On the input side the pulse transformer 30 shown in more detail in FIG. 4 has a monostable multivibrator 31 with an inverting input which cannot be post-triggered during the pulse output. The output pulse of said multivibrator 31 lasts slightly longer than the abovementioned double pulse 44, 45. The signal S20 fed to the pulse transformer 30 is simultaneously fed to the first inputs of an AND element 32 and an AND element 33. The output of the multivibrator 31 is connected to a second input of the AND element 32 and to an inverting input of the AND element 33. A signal S32 can be tapped off at the output of the AND element 32 and the signal S33 at the output of the AND element 33. The second pulse 45 of the double pulse 44, 45 generates a set pulse S32="1" for the RS flip-flop 34. The first pulse 44 of the double pulse 44, 45 and the single pulse 46 following the double pulse generate a reset pulse S33="1" for the RS FIG. 5 specifies a basic circuit diagram for the identically constructed pulse generators 11 and 15. The explanatory notes below relate to the pulse generator 11. On the input side, the trigger window signal SLV1 is fed to a monostable multivibrator 39 and to the inverting input of a monostable multivibrator 41. The output of the multivibrator 39 is fed, on the one hand, via a further monostable multivibrator 40 and on the other hand, via the inverting input of a monostable multivibrator 42 to first and second inputs of an OR element 43. A third input of the OR element 43 is connected to the output of the multivibrator 41. The output signal of the OR element 43 is fed to the light signal transmitter containing infrared luminescence diode 21. As a function of the rising edge of the trigger window signal SLV1, this output signal contains a double pulse 44, 45 and as a function of the falling edge of SLV1, a single pulse 46. The multivibrators 39–42 cannot be post-triggered during the pulse output.

Figure 6:
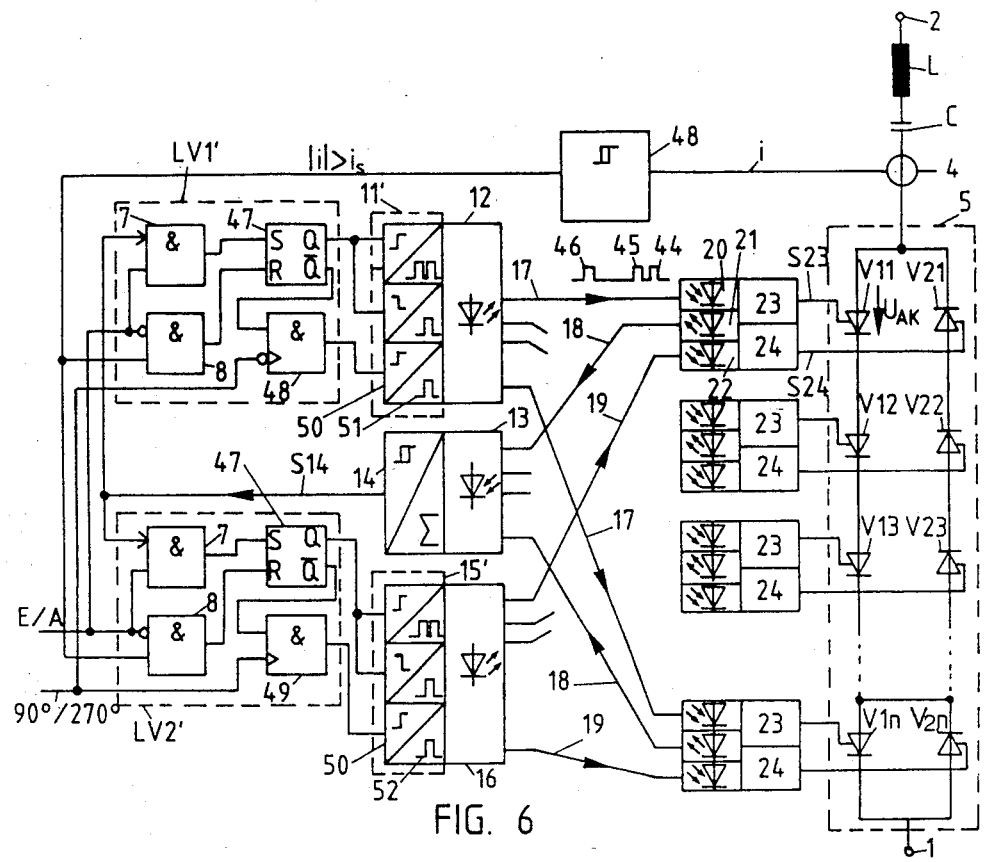
FIG. 6 shows a second triggering circuit for a thyristor switch according to FIG. 1, for carrying out a second exemplary embodiment of the inventive method.
Figure 7:
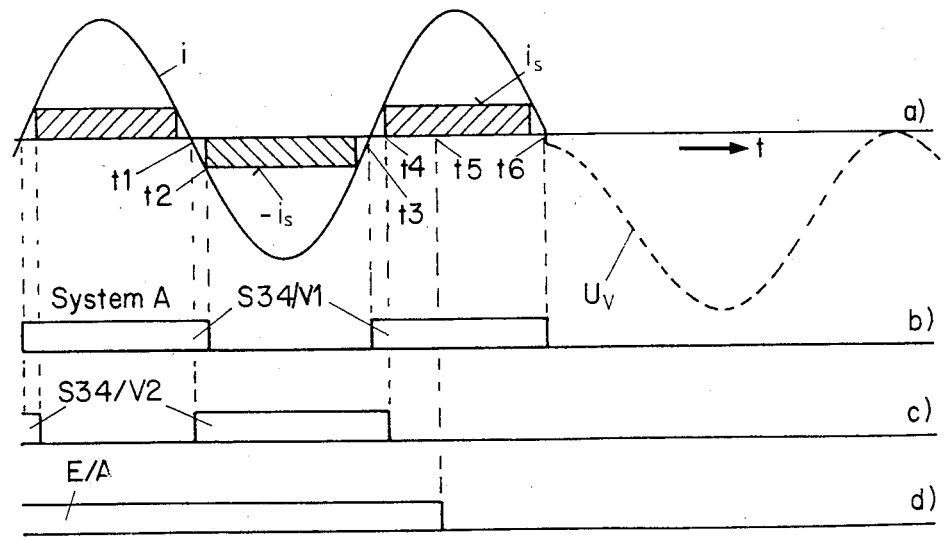
FIG. 7 shows a signal diagram for the switch-off behavior of a thyristor switch using the first triggering circuit according to FIG. 2.
Figure 8:
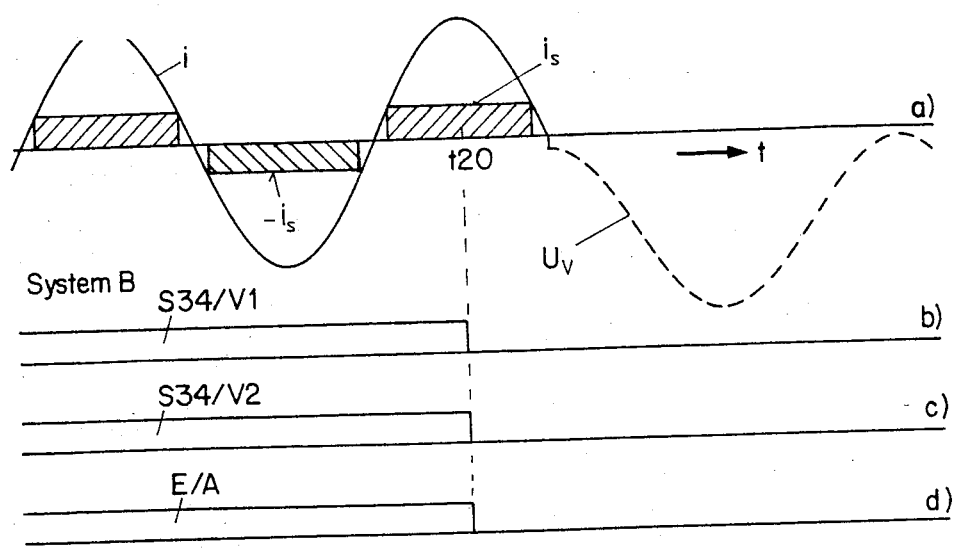
FIG. 8 shows a signal diagram for the switch-off behavior of a thyristor switch using the second triggering circuit according to FIG. 6.

A second triggering circuit for performing a second exemplary embodiment of the inventive triggering method or triggering system B is shown in FIG. 6 and, with the exception of different logic circuits LV1' and LV2' and also different pulse generators 11' and 15', corresponds to the first triggering circuit. The logic circuits LV1' and LV2' are of similar construction to each other. In contrast to the logic circuits LV1 and LV2, the monostable multivibrator 9 is omitted in this case. In contrast to the RS flip-flop 10, an RS flip-flop 47 does not require any OR gate in the reset input R. The S input of the RS flip-flop 47 is connected to the output of the AND element 7 and the reset input to the output of the AND element 8. The first input of the AND element 7 of LV1' and LV2' is again connected to the output of the sum threshold value element 14. The on-off signal E/A is again fed to the second inputs of the two AND elements 7 and also to the inverted first inputs of the two AND elements 8. Second inputs of the AND elements 8 are connected to the output of a current threshold value detector 48 whose output signal assumes the logic value "1" for $|i| > i_s$ and otherwise the value "0".

The $\overline{Q}$ output of the two RS flip-flops 47 is connected with a first input of an AND element 48 in LV1' or 49 in LV2'. The AND element 48 has a second inverted dynamic input to which a mains-synchronous 90°/270° square-wave signal is applied which is supplied from a regulating device not shown. The positive edge of the 90°/270° square-wave signal is generated with 90° valve voltage $U_V$ and the negative edge with 270° valve voltage $U_V$, cf. FIGS. 11(a) and 11(b) and also 12(a) and 12(b).

The AND element 49 has as its second input a non-inverted dynamic input to which said 90°/270° square-wave signal is applied. The outputs of the AND elements 48 and 49 are connected in each case to the input of a single pulse generator 50 which is a component part of a pulse generator 11' or 15'. The generators 11' and 15' differ from the pulse generators 11 and 15 in that they additionally contain said single pulse generator 50 which, as a function of a signal transmission on the input side from the "0" to the "1"- level, generates a single pulse 51 (in 11') or 52 (in 15'), cf. FIGS. 11(c) and 11(d) and also FIGS. 12(c) and 12(d).

As a function of said single pulses 51 or 52, a light signal is generated in the light signal transmitters 12 or 16, transmitted via the light guides 17 or 19 to the light signal receivers 20 or 22 and received there. For $U_{AK} > U_{AKG}$, a light signal is generated via the pulse transformer 30, cf. FIG. 3, via the AND element 36, the OR element 37, the diode 38 and the light signal transmitter 21 and transmitted via the light guide 18 to the light signal receiver 13 and converted therein into electrical signals. These are added in the sum threshold value element 14. The sum is compared with a specifiable limiting value. If the limiting value is exceeded, the output signal S14 is generated, cf. FIGS. 11(e) and 12(e).

Figure 11:
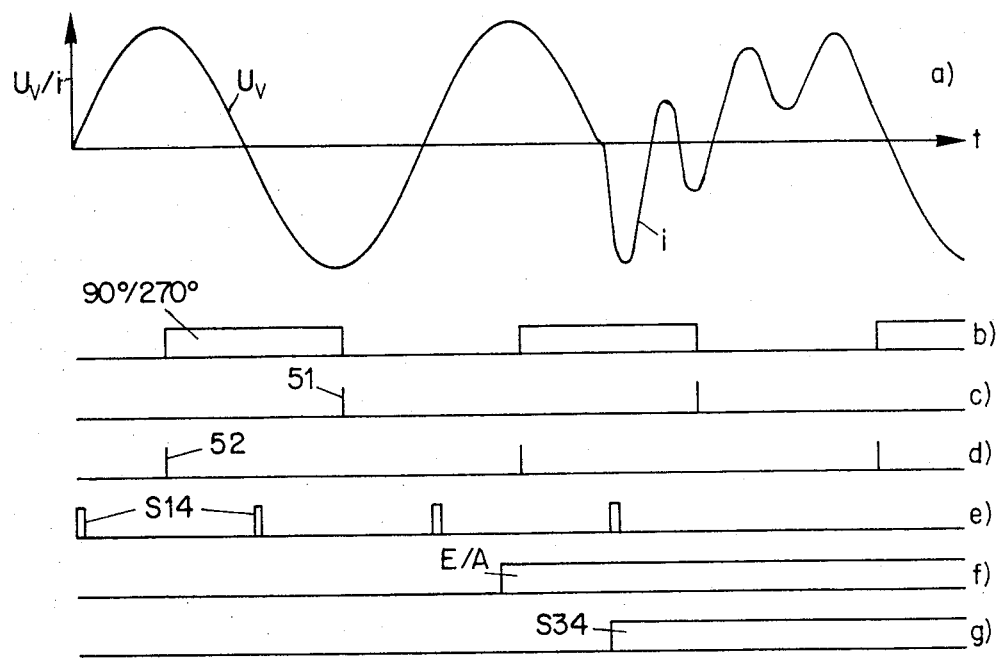
FIG. 11 shows a signal diagram for the switch-on process with an uncharged capacitor.

If bank of capacitors C is uncharged, an output signal S14="1" is generated after each passage through zero of $U_V$, cf. FIG. 11(e). If bank of capacitors C is charged with a continuously positive valve voltage $U_V$, the output signal S14="1" is generated only after a voltage minimum at 270°, since in this case $U_{AK} > U_{AKG}$ for the valves V1. At 90°, the anode-cathode voltage for the valves V2 is negative so that S14 remains="0".

Figure 12:
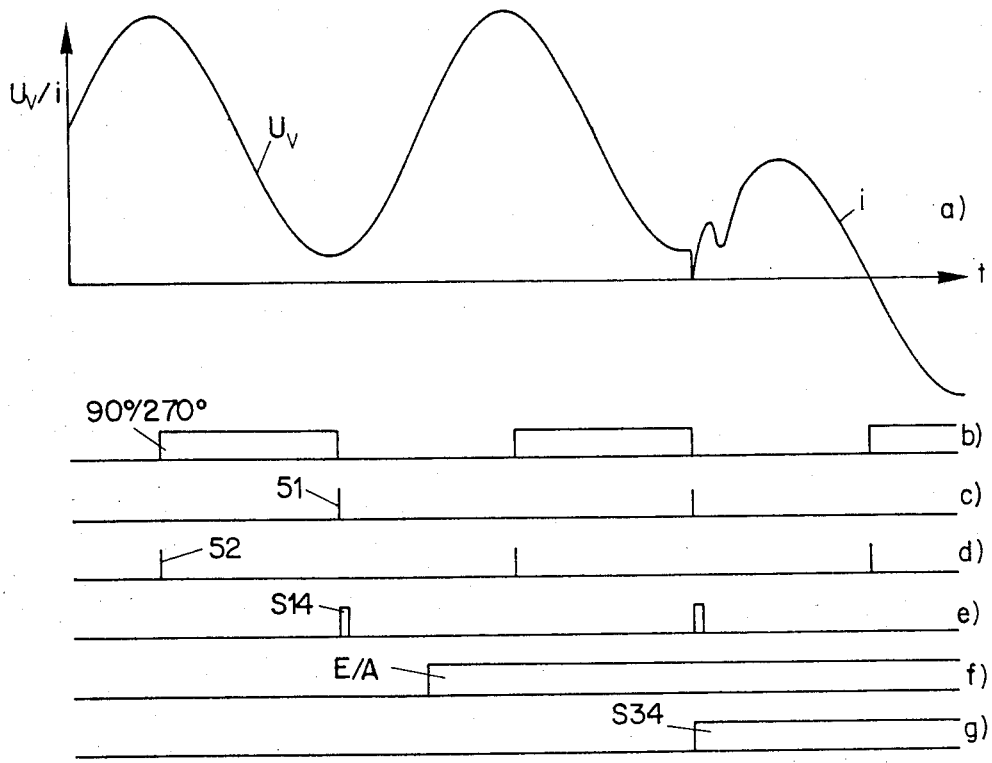
FIG. 12 shows a signal diagram for the switch-on process with a charged capacitor.

If a switch-on instruction E/A="1" is present simultaneously with the output signal S14="1", the thyristors or valves are triggered, cf. FIGS. 11(f) and 11(g) and also FIGS. 12(f) and 12(g). This method achieves the result that the thyristors or valves are always triggered at minimum positive voltage.

The novel triggering method is explained below for the systems A and B by reference to FIGS. 7-10 in which different signal diagrams are shown as a function of the time t.

FIG. 7a shows, for the system A (triggering circuit in FIG. 2), the variation with time of the valve current i which has passages through zero at the instances t1, t3 and t6 and is switched off at the instant t6 by the thyristor switch 5. The current threshold values $i_s$ and $-i_s$ are plotted in shaded form. The on-off signal E/A, cf. FIG. 7(d) has the logic value "1" up to the instant t5. During the passage of the current through zero at instant t1, the thyristors V1, which had previously been conducting, switch off, and the anode-cathode voltages $U_{AK}$ of 80% of the cut-off thyristors V2 exceed the switch-on voltage limiting value $U_{AKG}$ of 50 V within 50 μs. As a result the trigger standby signal s34 for the thyristors V2, denoted as S34/V2 for short, is set to "1", cf. FIG. 7(c) and each of the thyristors V2 receives a trigger pulse S24 provided its individual anode-cathode voltage $U_{AK} > U_{AKG}$. As a result of the fact that 80% of the thyristors switch on virtually at the same instant, the anode-cathode voltage $U_{AK}$ on them collapses and the anode-cathode voltage on the remaining 20% of the thyristors rises very rapidly so that these also trigger reliably and are therefore switched on.

As soon as the valve current i through the thyristors V2 exceeds the threshold value $i_s$ ($i = -i_s$ at instant t2), the trigger standby pulse S34 for the thyristors V1, denoted as S34/V1 for short, vanishes, cf. FIG. 7(b). The anode-cathode voltage $U_{AK}$ of 80% of the cut-off thyristors V1 exceeds the switch-on voltage limiting or threshold value $U_{AKG}$ within 50 μs after the passage of the current i through zero at instant t3, and the trigger standby signal S34/V1 is set to "1", cf. FIG. 7(b). At instant t4, $i > i_s$, so that S34/V2 becomes="0" and can no longer be set to "1" after the instant t5 because E/A="0".

At instant t6 a voltage jump appears as a result of the inductance of the choke coil, in the valve voltage $U_V$ shown as a broken line, so that for E/A="0", S14="1" and the output signal of the AND element 8 of LV1 consequently assumes the logic value "1". As a result of this the RS flip-flop 10 is reset, SLV1="0" and S34/V1="0".

In the case of system A, the trigger standby signals S34/V1 and S34/V2 are in each case generated or set to "1" after a certain number of positive voltage check-back signals has been reached and are erased or set to "0" after the current threshold of the antiparallel valves has been reached.

FIG. 8a shows, for the system B (triggering circuit in FIG. 6), the variation with time of the valve current i and, as a dotted line, the variation of the valve voltage $U_V$. Here the trigger standby signals S34/V1, cf. FIG. 8(b) and S34/V2, cf. FIG. 8(c) remain at logic "1" for the total period of the switch-on condition (E/A="1") of the on-off signal E/A, i.e. up to the instant t20, cf. FIG. 8(d). With E/A="0" and $|i| > i_s$, the output signal of the two AND elements 8 of FIG. 6 become logic "1", so that both RS flip-flops 47 are reset and S34/V1 becomes="0" and also S34/V2 becomes="0". The trigger standby signals S34/V1 and S34/V2 are set to "0" with the switch-off instruction (E/A="0") of the on-off signal E/A provided one of the thyristors V1 or V2 has exceeded the current threshold value $i_s$.

Figure 9:
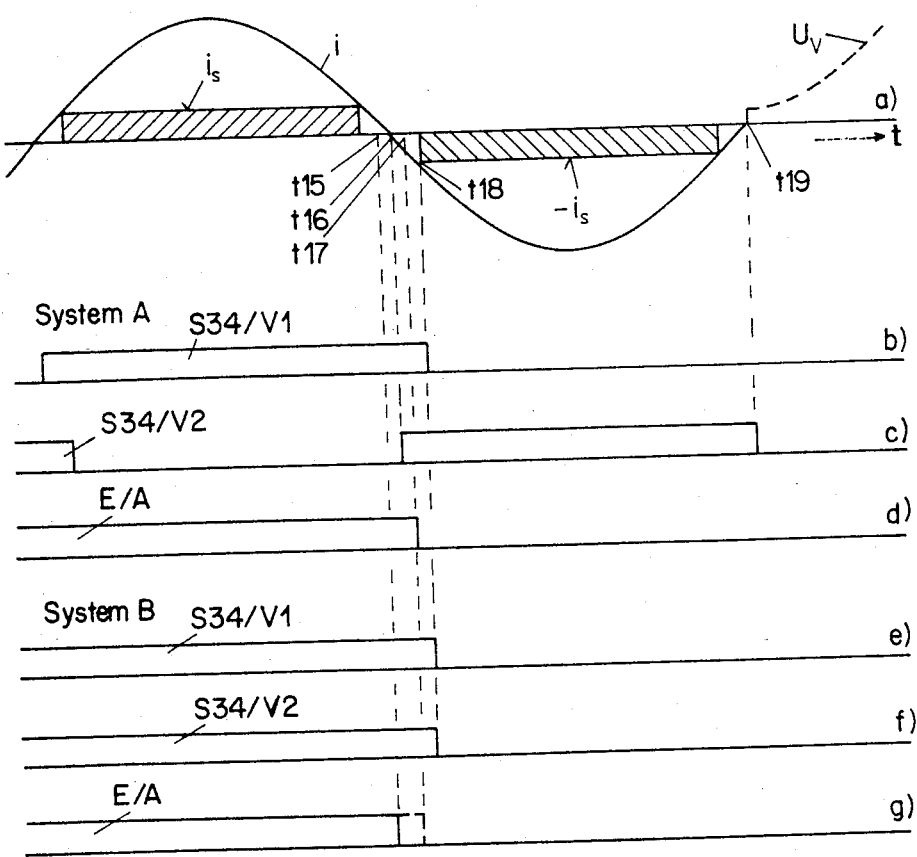
FIG. 9 shows a signal diagram for the switch-off behavior of a thyristor switch using the triggering circuits according to FIGS. 2 and 6 if the switch-off instruction occurs in the region of the passage of the current through zero.

FIG. 9 shows the switch-off behavior of the thyristors V1 and V2 for the systems A and B in the region of the passage of the current through zero. Here the FIGS. 9(b)–9(d) refer to the system A (triggering circuit in FIG. 2) and the FIGS. 9(e)–9(g) to the system B (triggering circuit in FIG. 6).

In the system A, the switch-off instruction E/A="0" arrives, for example, at instant t17 shortly after the passage of the valve current i through zero, cf. FIG. 9(d). As described in connection with FIG. 7 about 50 μs after the instant t16 of the passage of the current through zero, S34/V2 becomes="1" and at the instant t18, S34/V1="0" because $|i|<i_s$. At instant t19 of the subsequent passage of the current through zero, S34/V2 also becomes="0".

In the system B, the switch-off instruction E/A="0" arrives at instant t15 or t17, cf. FIG. 9(g) shortly before or after the passage of the current through zero. Since the RS flip-flops 47 are reset if E/A="0" and $|i|>i_s$ simultaneously, the trigger standby signals S34/V1 and S34/V2 only vanish at instant t18.

FIG. 10 shows the switch-on behavior of the thyristors V1 and V2 for the systems A and B. Here the FIGS. 10(b)–10(d) refer to the system A and the FIGS. 10(e)–10(g) to the system B. The switch-on instruction E/A="1" arrives in both systems at instant t0, cf. FIGS. 10(d) and 10(g).

In system A the RS flip-flop 10 of LV1 only receives a set pulse via the AND element 7 if S14 also becomes="1" after E/A="1". This is the case at instant t7 if the valve voltage $U_V$ is greater than $U_{AKG}$ for 80% of the thyristors V1, cf. FIG. 10(a) and 10(b). As a function of said set pulse, SLV1 becomes="1" and S34/V1 becomes="1". At instant t7, S34/V2 also becomes="1" and maintains this condition until the RS flip-flop 10 of LV2 is reset when the current threshold value $i_s$ of the antiparallel thyristor V1 is reached. The trigger standby signal S34/V2 is then only set again to "1" after a passage of the current through zero at instant t9.

At instant t0, S14="0". As a function of a rising edge of its input pulse, the multivibrator 35, cf. FIG. 3, delivers only one output pulse of 15 μs duration so that the sum threshold value element 14, cf. FIG. 2, cannot exceed the threshold value.

In system B the same setting condition applies to the RS flip-flop 37 as in system A. The trigger standby signals S34/V1 and S34/V2 remain at "1" until the switch-off condition explained in conjunction with FIGS. 8 and 9 exists.

By means of a switch-on logic which is not shown, it is possible to achieve the result that S34/V2 is only set to "1" at instant t9, as shown by the dotted line in FIG. 10(f).

Instead of coding the light pulses by means of double and single pulses, coding by means of triple and double pulses may also, for example, be provided. In particular this is advantageous if a separate single pulse is required for monitoring the thyristors, which is not dealt with in more detail here. The voltage polarity monitoring, explained in connection with FIG. 6, by means of the 90°/270° square-wave signal may be advantageously employed also in the circuit according to FIG. 2.

While there are shown and described present preferred embodiments of the invention, it is to be distinctly understood that the invention is not limited thereto, but may be otherwise variously embodied and practiced within the scope of the following claims, Accordingly,

We claim:

1. A triggering method for triggering a thyristor switch containing a multiple number of thyristors encompassing a predetermined number of series connected thyristors and a series connected of a predetermined number of thyristors connected antiparallel to said predetermined number of series connected thyristors, said method comprising the steps of:
   generating an on-off signal for switching on the thyristor switch in the presence of the on-off signal and for switching off the thyristor switch in the absence of said on-off signal;
   detecting the anode-cathode voltage present at said multiple number of thyristors;
   defining a predetermined threshold value of said anode-cathode voltage and comparing the detected anode-cathode voltage with said predetermined threshold value of said anode-cathode voltage;
   generating a trigger standby signal of a predetermined duration in the presence of (i) said on-off signal and (ii) an anode-cathode voltage in excess of said predetermined threshold value of said anode-cathode voltage at a preselected number of said multiple number of thyristors; and
   triggering at least once said multiple number of thyristors by generating a triggering pulse during said predetermined duration of said trigger standby signal.

2. The triggering method as claimed in claim 1, wherein:
   said step of generating said trigger standby signal entails generating said trigger standby signal only if said preselected number of thyristors at which the anode-cathode voltage is greater than the predetermined threshold value of said anode-cathode voltage, contains at least 80% of each one of said predetermined numbers of thyristors which respectively encompass said series connected thyristors and said antiparallel connected thyristors.

3. The triggering method as claimed in claim 1, wherein:
   said step of defining said predetermined threshold value of said anode-cathode voltage entails setting said predetermined threshold value at $\geq 30$ V.

4. The triggering method as claimed in claim 1, further including the steps of:
   producing, by means of an auxiliary power source which is governed by the operating condition of the associated thyristor, a voltage signal which is dependent upon said operating condition of said associated thyristor;
   defining a predetermined threshold value of said voltage signal and comparing the produced voltage signal with said predetermined threshold value of said voltage signal; and
   said step of triggering at least once said multiple number of thyristors by generating said triggering pulse, including the step of generating said triggering pulse for said associated thyristor only if the voltage signal of said auxiliary power source is greater than said predetermined threshold value of said voltage signal.

5. The triggering method as claimed in claim 4, wherein:
   said step of defining said predetermined threshold value of said voltage signal of the auxiliary power source, entails setting said predetermined threshold value at $\geq 20$ V.

6. The triggering method as claimed in claim 1, further including the steps of:
   detecting the current flowing through a selected one of said predetermined number of series connected thyristors;

defining a predetermined threshold value of said current and comparing the detected current with said predetermined threshold value of said current; and terminating the associated trigger standby signal in the absence of the on-off signal if simultaneously the current flowing through said selected thyristor exceeds said predetermined threshold value of said current.

7. The triggering method as claimed in claim 1, further including the steps of:

detecting the current flowing through a selected one of said predetermined number of antiparallel connected thyristors;

defining a predetermined threshold value of said current and comparing the detected current with said predetermined threshold value of said current; and terminating the associated trigger standby signal if the current flowing through said selected thyristor exceeds said predetermined threshold value of said current.

8. The triggering method as claimed in claim 1, further including the steps of:

detecting the current flowing through a selected one of said multiple number of thyristors;

defining a predetermined threshold value of said current and comparing the detected current with said predetermined threshold value of said current;

terminating the associated trigger standby signal in the absence of the on-off signal if simultaneously the current flowing through said selected thyristor exceeds said predetermined threshold value of said current; and setting said threshold value for the current at >5% of a rated current flowing through said selected thyristor.

9. The triggering method as claimed in claim 1, further including the steps of:

applying a periodically varying voltage to a triggering circuit for triggering a selected one of said multiple number of thyristors and having predetermined voltage values at 90° and 270° of each period; and during said step of generating said trigger standby signal, generating the trigger standby signal as a function of said predetermined voltage values at 90° and 270°.

10. The triggering method as claimed in claim 1, further including the steps of: applying a constant positive voltage and a periodically varying voltage to a triggering circuit for triggering a selected one of said multiple number of thyristors and having predetermined voltage values at 90° and at 270° of each period and a minimum positive voltage; and during said step of generating said trigger standby signal, generating the trigger standby signal as a function of said predetermined voltage values at 90° and 270° and at said minimum positive voltage.

11. The triggering method as claimed in claim 1, wherein:

said step of defining said predetermined threshold value of said anode-cathode voltage entails setting said predetermined threshold value in the region between 40 V and 60 V.

12. The triggering method as claimed in claim 5, further including the steps of:

feeding the auxiliary power source from a main current path of the associated thyristor in the conductive condition of the associated thyristor and from the thyristor voltage in the cut-off condition of the associated thyristor.

13. The triggering method as claimed in claim 5, further including the steps of:

detecting the current flowing through a selected one of said multiple number of thyristors;

defining a predetermined threshold value of said current and comparing the detected current with said predetermined threshold value of said current; and terminating the associated trigger standby signal in the absence of the on-off signal if simultaneously the current flowing through said selected thyristor exceeds said predetermined threshold value.

14. The triggering method as claimed in claim 13, wherein:

during said step of defining said predetermined threshold value of said current flowing through said selected thyristor, setting said predetermined threshold value of said current at >5% of the thyristor rated current.

15. The triggering method as claimed in claim 14, further including the steps of:

applying a constant positive voltage and a periodically varying voltage to a triggering circuit for triggering a selected one of said multiple number of thyristors and having predetermined voltage values at 90° and at 270° of each period and a minimum positive voltage;

during said step of generating said trigger standby signal, generating the trigger standby signal as a function of said predetermined voltage values at 90° and 270° and at said minimum positive voltage; and during said step of triggering at least once said multiple number of thyristors by generating said triggering pulse, triggering said thyristors by optical triggering.

16. The triggering method as claimed in claim 5, further including the steps of:

applying a constant positive voltage and a periodically varying voltage to a triggering circuit for triggering a selected one of said multiple number of thyristors and having predetermined voltage values at 90° and at 270° of each period and a minimum positive voltage;

during said step of generating said trigger standby signal, generating the trigger standby signal as a function of said predetermined voltage values at 90° and 270° and at said minimum positive voltage; and during said step of triggering at least once said multiple number of thyristors by generating said triggering pulse, triggering said thyristors by optical triggering.

17. A triggering method for triggering a thyristor switch containing a multiple number of thyristors encompassing a predetermined number of series connected thyristors and a series connection of a predetermined number of thyristors connected antiparallel to said predetermined number of series connected thyristors, said method comprising the steps of:

generating an on-off signal for switching on the thyristor switch in the presence of the on-off signal and for switching off the thyristor switch in the absence of said on-off signal;

detecting the anode-cathode voltage present at said multiple number of thyristors;

defining a predetermined threshold value of said anode-cathode voltage and comparing the detected anode-cathode voltage with said predetermined threshold value of said anode-cathode voltage;

setting said predetermined threshold value of said anode-cathode voltage at greater than or equal to 30 volts; and generating a triggering pulse for triggering said multiple number of thyristors if said anode-cathode voltage in at least 30% of said multiple number of thyristors has as said anode-cathode voltage, a value in excess of said predetermined threshold value of said anode-cathode voltage.

18. The triggering method as claimed in claim 17, further including the steps of:

detecting the current flowing through a selected one of said multiple number of thyristors;

defining a predetermined threshold value of said current flowing through said selected thyristor and comparing the detected current with said predetermined threshold value of said current;

setting said predetermined threshold value of said current at a value greater than 5% of the rated current flow through said selected thyristor; and terminating said triggering pulse if the on-off signal assumes the off-condition and, substantially simultaneously, said current flowing through said selected thyristor exceeds said predetermined threshold value of said current.

19. The triggering method as claimed in claim 17, further including the steps of:

applying to the thyristor switch, a periodical varying voltage having predetermined voltage values at 90° and at 270° of each period; and selectively generating said triggering pulse as a function of either (i) the predetermined voltage value at 90°, (ii) the predetermined voltage value at 270°, or (iii) the predetermined voltage values at 90° and at 270° of each period of said voltage applied to said thyristor switch.

20. The triggering method as claimed in claim 19, further including the steps of:

applying a constant positive voltage to said thyristor switch; and during said step of generating said triggering pulse, generating said triggering pulse at a minimum positive voltage.

21. The triggering method as claimed in claim 20, wherein:

during said step of triggering at least one said multiple number of thyristors by means of said triggering pulse, triggering said multiple number of thyristors by optical triggering.

22. The triggering method as claimed in claim 17, wherein:

said step of defining said predetermined threshold value of said anode-cathode voltage entails setting said predetermined threshold value at a voltage in the range of 40 V through 60 V.

23. The triggering method as claimed in claim 17, further including the steps of:

operatively connecting an auxiliary power source to each one of said multiple number of thyristors for generating a voltage signal dependent upon the operating condition of said thyristor;

said step of operatively connecting said auxiliary power source to said thyristor entials feeding said auxiliary power source from a main current path in said thyristor in its conductive state and from the thyristor voltage in its non-conductive state;

defining a predetermined threshold voltage of said voltage signal and comparing said generated voltage signal with said predetermined threshold value of said voltage signal; and said step of generating said triggering pulse entails generating said triggering pulse only if said voltage signal generated by said auxiliary power source exceeds said predetermined threshold value of said voltage signal by at least 20 V.

24. The triggering method as claimed in claim 23, further including the steps of:

applying to the thyritor switch, a periodical varying voltage having predetermined voltage values at 90° and at 270° of each period; and selectively generating said triggering pulse either (i) as a function of the predetermined voltage value at 90°, (ii) at the predetermined voltage value at 270°, or (iii) at said predetermined voltage values at 90° and at 270° of each period of said voltage applied to said thyristor switch.

25. The triggering method as claimed in claim 24, further including the steps of:

applying a constant positive voltage to said thyristor switch; and during said step of generating said triggering pulse, generating said triggering pulse at a minimum positive voltage.

26. The triggering method as claimed in claim 25, wherein:

during said step of triggering at least once said multiple number of thyristors by means of said triggering pulse, triggering said multiple number of thyristors by optical triggering.

27. The triggering method as claimed in claim 23, further including the step of:

said step of defining said predetermined threshold value of said anode-cathode voltage entails setting said predetermined threshold value at a voltage in the range of 40 V through 60 V.

* * * * *